(12) United States Patent
McQuaide, Jr. et al.

(10) Patent No.: US 9,639,613 B2
(45) Date of Patent: *May 2, 2017

(54) METHODS, SYSTEMS, AND PRODUCTS FOR DISCOVERING ELECTRONIC DEVICES

(71) Applicant: AT&T Intellectual Property I, L.P., Atlanta, GA (US)

(72) Inventors: Arnold Chester McQuaide, Jr., Berkeley Lake, GA (US); Maria Adamczyk, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/934,178

(22) Filed: Nov. 6, 2015

(65) Prior Publication Data

US 2016/0063113 A1   Mar. 3, 2016

Related U.S. Application Data

(63) Continuation of application No. 14/053,627, filed on Oct. 15, 2013, now Pat. No. 9,208,363, which is a continuation of application No. 13/359,549, filed on Jan. 27, 2012, now Pat. No. 8,587,412, which is a continuation of application No. 11/893,318, filed on Aug. 15, 2007, now Pat. No. 8,130,079.

(51) Int. Cl.
| | |
|---|---|
| G08B 21/00 | (2006.01) |
| G06F 17/30 | (2006.01) |
| G08C 19/28 | (2006.01) |
| G06K 7/10 | (2006.01) |
| H04L 29/12 | (2006.01) |
| H04L 29/08 | (2006.01) |

(52) U.S. Cl.
CPC .. *G06F 17/30864* (2013.01); *G06F 17/30551* (2013.01); *G06F 17/30598* (2013.01); *G06K 7/10029* (2013.01); *G08C 19/28* (2013.01); *H04L 61/1552* (2013.01); *H04L 67/025* (2013.01); *G08C 2201/20* (2013.01); *G08C 2201/50* (2013.01)

(58) Field of Classification Search
CPC ............ G06K 7/10029; G08C 2201/50; G08C 2201/20
USPC ...... 340/4.11, 4.34, 4.42, 5.22, 12.22, 12.23, 340/12.28, 13.24, 13.31, 13.21, 3.7, 3.71
See application file for complete search history.

(56) References Cited

U.S. PATENT DOCUMENTS

| | | |
|---|---|---|
| 5,142,398 A | 8/1992 | Heep |
| 5,530,702 A | 6/1996 | Palmer et al. |
| 5,629,868 A | 5/1997 | Tessier |
| 5,819,294 A | 10/1998 | Chambers |
| 5,909,183 A | 6/1999 | Borgstahl |
| 6,111,872 A | 8/2000 | Suematsu et al. |
| 6,124,804 A | 9/2000 | Kitao |
| 6,157,319 A | 12/2000 | Johns |
| 6,160,491 A | 12/2000 | Kitao |
| 6,225,938 B1 | 5/2001 | Hayes |
| 6,784,787 B1 | 8/2004 | Atkins et al. |

(Continued)

*Primary Examiner* — Mark Rushing
(74) *Attorney, Agent, or Firm* — Scott P. Zimmerman, PLLC

(57) ABSTRACT

Methods, systems, and products self-identify an electronic device to a remote control. The remote control queries the electronic device, and the electronic device sends a response. A collision avoidance mechanism allows difference devices to respond to the remote control.

20 Claims, 15 Drawing Sheets

(56) References Cited

U.S. PATENT DOCUMENTS

| | | |
|---|---|---|
| 6,819,259 B2 | 11/2004 | Yamaguchi |
| 6,914,551 B2 | 7/2005 | Vidal |
| 6,996,402 B2 | 2/2006 | Logan et al. |
| 7,027,881 B2 | 4/2006 | Yumoto |
| 7,046,161 B2 | 5/2006 | Hayes |
| 7,050,867 B2 | 5/2006 | Maymudes |
| 7,095,456 B2 | 8/2006 | Nakajima |
| 2004/0070491 A1 | 4/2004 | Huang |
| 2005/0242927 A1 | 11/2005 | Friedrich |
| 2006/0076401 A1 | 4/2006 | Frerking |
| 2006/0238373 A1 | 10/2006 | Sung |
| 2006/0268768 A1 | 11/2006 | Harris et al. |
| 2006/0281477 A1 | 12/2006 | Downes |

METHODS, SYSTEMS, AND PRODUCTS FOR DISCOVERING ELECTRONIC DEVICES

CROSS-REFERENCE TO RELATED APPLICATIONS

This application is a continuation of U.S. application Ser. No. 14/053,627 filed Oct. 15, 2013 and since issued as U.S. Pat. No. 9,208,363, which is a continuation of U.S. application Ser. No. 14/053,627 filed Oct. 15, 2013 and since issued as U.S. Pat. No. 9,208,363, which is a continuation of U.S. application Ser. No. 13/359,549 filed Jan. 27, 2012 and since issued as U.S. Pat. No. 8,587,412, which is a continuation of U.S. application Ser. No. 11/893,318 filed Aug. 15, 2007 and since issued as U.S. Pat. No. 8,130,079, with all applications incorporated herein by reference in their entireties.

BACKGROUND

Exemplary embodiments generally relate to communications and to television and, more particularly, to receivers, to transmitters, and to remote controls.

Remote controls can be improved. Remote controls are ubiquitous and used to remotely control almost every type of electronic device. A so-called automatically-configurable or "universal" remote control has been proposed to remotely control multiple electronic devices, thus eliminating a separate remote for each device. A problem with these universal remote controls, however, is a polling mechanism to identify controllable electronic devices. When a remote control requests self-identification from electronic devices, responses from those controllable electronic devices may collide at the remote control. Most remote controls can only receive and process one response at a time. When two or more responses are nearly simultaneously received, the remote control may only process one of those responses. The other response may be ignored.

SUMMARY

The exemplary embodiments provide methods, systems, and products for discovering and/or identifying controllable electronic devices. Exemplary embodiments describe a collision avoidance mechanism that helps reduce or prevent simultaneous receipt of multiple automatic configuration responses from electronic devices. A method, for example, receives a query at a remote control interface. A response to the query is determined. A random response interval of time is determined according to a collision avoidance mechanism. When the random response interval of time expires, then the response to the query is sent.

More exemplary embodiments include a system for discovering an electronic device. The system includes means for receiving a query at a remote control interface. Means are also included for determining a response to the query. Means are included for determining a random response interval of time according to a collision avoidance mechanism. When the random response interval of time has expired, then means are included for sending the response to the query.

Other exemplary embodiments describe a computer program product for discovering electronic devices. A query is received at a remote control interface. A response to the query is determined. A random response interval of time is determined according to a collision avoidance mechanism. When the random response interval of time expires, then the response to the query is sent.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
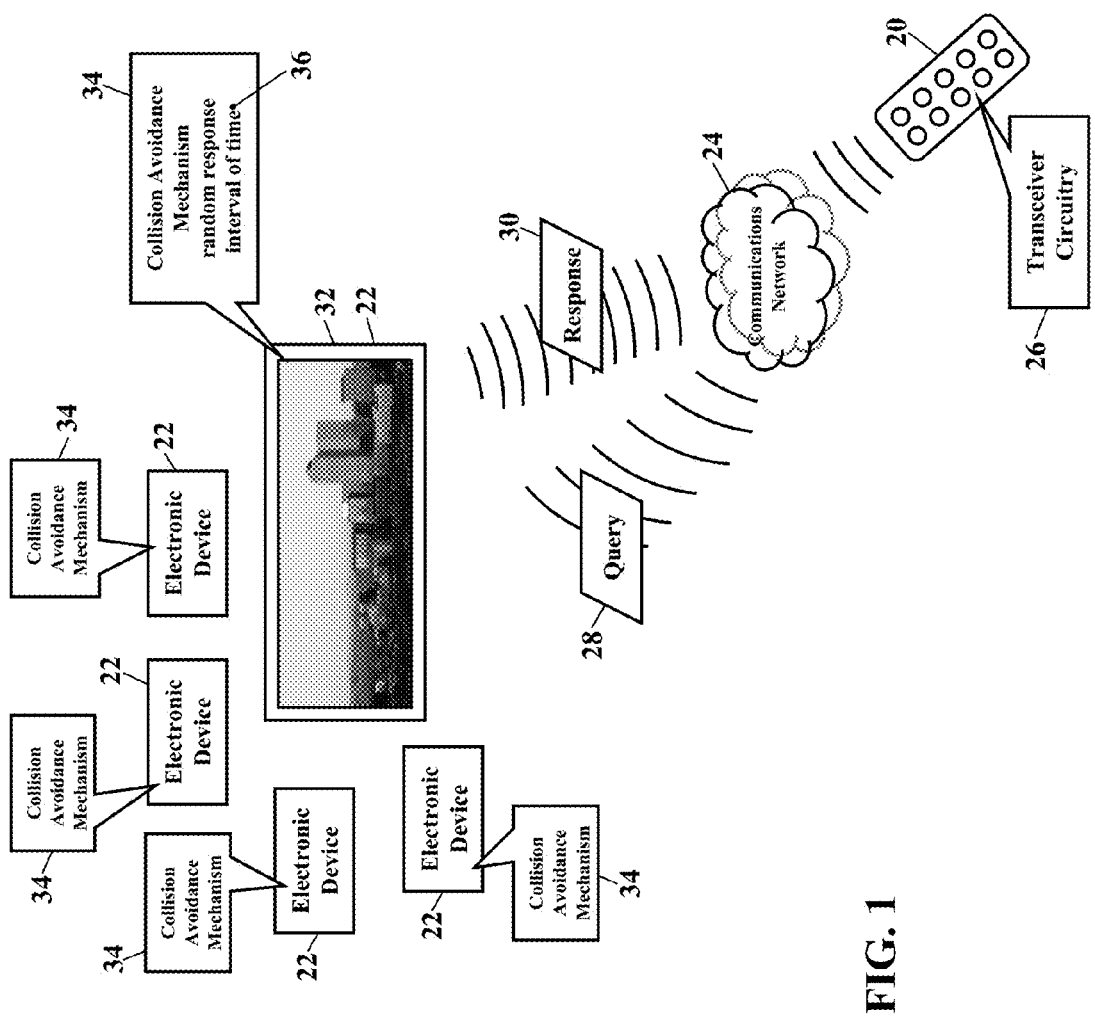
FIG. 1 is a schematic illustrating an operating environment in which exemplary embodiments may be implemented.

FIG. 1 is a simplified schematic illustrating an environment in which exemplary embodiments may be implemented. A remote control 20 communicates with one or more electronic devices 22 via a communications network 24. Although the electronic devices 22 are generically shown, the electronic devices 22 may include any television, video monitor, computer, radio or satellite receiver, music player, digital recorder, or any other device. The remote control 20 may be a universal remote control that controls the operation of one, some, or all of the electronic devices 22. The electronic devices 22, for example, may be components of a user's entertainment system, and the remote control 20 universally controls those components. The remote control 20 may include transceiver circuitry 26 that sends a query 28 to the electronic devices 22. The query 28 communicates via the communications network 24, such that the query 24 instructs each electronic device 22 to respond and to identify itself. The query 28, for example, may be a "who are you?" query that solicits each electronic device 22 for identification and/or control information. FIG. 1 illustrates the query 28 being broadcasted to each electronic device 22, yet the query 28 may be coded, encrypted, or otherwise formatted for a single electronic device 22. The query 28 may be sent via any means, such as a BLUETOOTH® signal and/or an infrared "line of sight" signal.

However the query 28 is sent, the electronic devices 22 respond. When each electronic device 22 receives the query 28, each electronic device 22 sends a response 30 to the query 28, according to exemplary embodiments. FIG. 1, for simplicity, only illustrates a television 32 sending the response 30. The reader may understand, however, that some or all of the electronic devices 22 may send responses to the query 28. The response 30 sent from the television 32 may include codes or other information that describe or identify the manufacturer of the television 32, its serial number, its model number, its componentry, and/or its code sets for accessing functions and features via the remote control 20, as is known to those of ordinary skill in the art. Each electronic device 22, in fact, may respond to the query 28 and self-identify its manufacturer, serial number, model number, componentry, and/or code sets. The remote control 20 may then use this self-identification information to configure itself to remotely control each electronic device 22, again as is known to those of ordinary skill in the art.

The television 32, however, may invoke a collision avoidance mechanism 34. According to exemplary embodiments, the collision avoidance mechanism 34 helps reduce or prevent simultaneous receipt of multiple self-identification responses from the electronic devices 22. As FIG. 1 illustrates, the remote control 20 may only include the single transceiver 26. That is, the receiver circuitry of the transceiver 26 may only receive and process one response at a time. If the remote control 20 had multiple receivers, the remote control 20 may be capable of receiving multiple, simultaneous responses from the electronic devices 22. Yet some or most remote controls (like the remote control 20) only have a single receiver to reduce cost and complexity. When the receiver is receiving and/or processing a response, other responses may be ignored until the transceiver 26 is again ready to receive and process another response.

The collision avoidance mechanism 34, then, helps reduce or prevent simultaneous receipt of multiple responses. Each of the electronic devices 22 may include the collision avoidance mechanism 34. The collision avoidance mechanism 34 instructs each electronic device 22 to implement a random response interval 36 of time when responding to the query 28. As later paragraphs will explain, because the random response interval 36 of time is randomly determined, the random response interval 36 of time is likely different for each electronic device 22. Each electronic device 22 delays sending a response to the query 28 for the random response interval 36 of time. The television 32, for example, delays sending its response 30 according to the random response interval 36 of time determined by its resident collision avoidance mechanism 34. Because each electronic device 22 implements a different random delay, this randomization creates a reduced chance of the remote control 20 simultaneously receiving multiple responses to the query 28. The collision avoidance mechanism 34 helps prevent the remote control 20 from ignoring simultaneously-received responses and, thus, failing to identify a controllable device.

Some aspects of remote controls and their interfaces are known, so this disclosure will not greatly explain the known details. If the reader desires more details, the reader is invited to consult the following sources: U.S. Pat. No. 5,629,868 to Tessier, et al.; U.S. Pat. No. 5,819,294 to Chambers; U.S. Pat. No. 5,909,183 to Borgstahl, et al.; U.S. Pat. No. 6,124,804 to Kitao, et al.; U.S. Pat. No. 6,157,319 to Johns, et al.; U.S. Pat. No. 6,160,491 to Kitao, et al.; U.S. Pat. No. 6,225,938 to Hayes, et al.; U.S. Pat. No. 6,914,551 to Vidal; U.S. Pat. No. 7,027,881 to Yumoto, et al.; U.S. Pat. No. 7,046,161 to Hayes; U.S. Pat. No. 7,050,867 to Maymudes; U.S. Pat. No. 7,095,456 to Nakajima; U.S. Patent Application Publication 2004/0070491 to Huang, et al.; and U.S. Patent Application Publication 2006/0281477 to Downes.

Exemplary embodiments may be applied regardless of networking environment. The communications network 24 may be a wireless network utilizing any portion of the electromagnetic spectrum and any signaling standard (such as the I.E.E.E. 802 family of standards, the BLUETOOTH® standard, the infrared portion, and/or the ISM band). The communications network 24 may even utilize GSM/CDMA/TDMA or any cellular standard. The remote control 20, however, may even interface with wired portions, such as coaxial cables, copper wires, fiber optic lines, and/or hybrid-coaxial lines. The concepts described herein may be applied to any wireless/wireline communications network, regardless of physical componentry, physical configuration, or communications standard(s).

Figure 2:
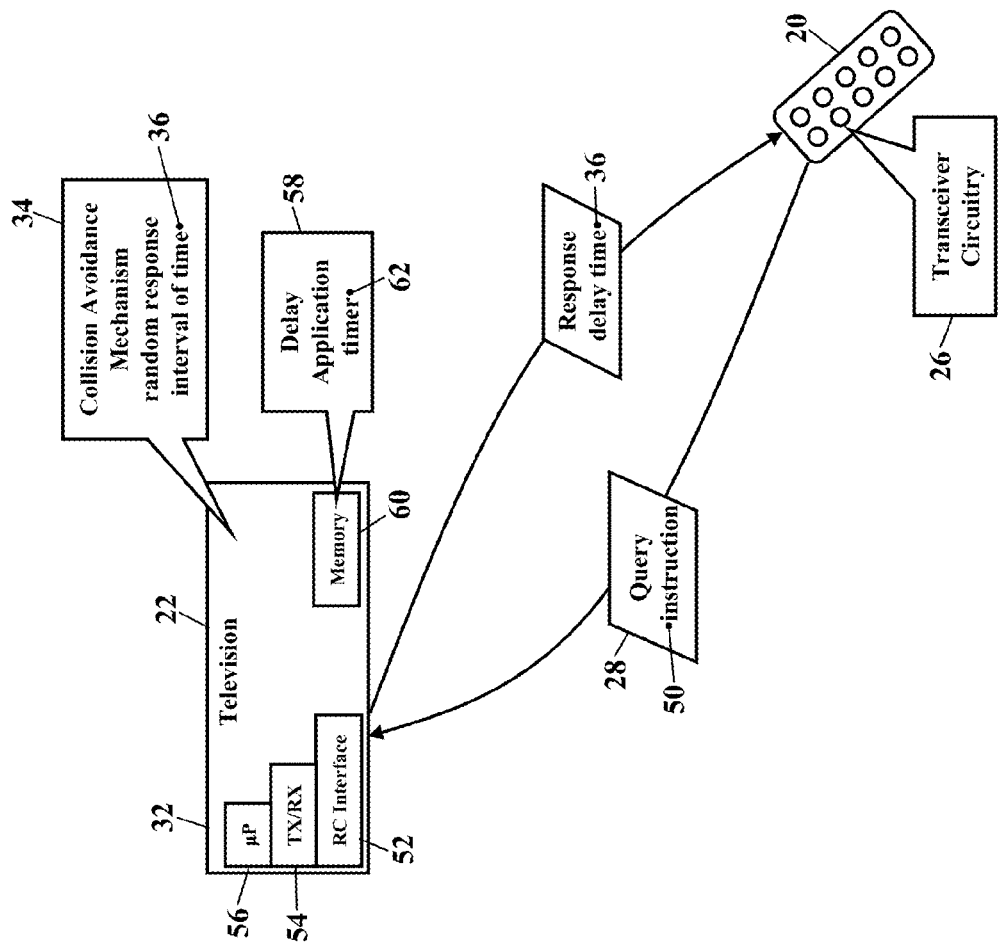
FIG. 2 is a more detailed schematic illustrating communication between a remote control and electronic devices, according to more exemplary embodiments.

FIG. 2 is a more detailed schematic illustrating communication between the remote control 20 and the electronic devices 22, according to more exemplary embodiments. Again, for simplicity, FIG. 2 only illustrates the remote control 20 sending the query 28 to the television 32. Those skilled in the art should understand, though, that the remote control 20 may send the query 28 to any, some, or all of the electronic devices 22 illustrated in FIG. 1. The query 28 may include an instruction 50 for the television 32 to respond and to self-identify. The television 32 has a remote control interface ("RC Interface") 52 that receives the query 28 and other signals from the remote control 20. The remote control interface 52 may include a wireless transceiver 54, as is known. When the remote control interface 52 receives the query 28, the collision avoidance mechanism 34 may instruct a processor 56 (e.g., "μP"), application specific integrated circuit (ASIC), or other device to execute a delay application 58 stored in memory 60. The delay application 58 is a set of processor-executable instructions that cause the processor 56 to calculate and to implement the random response interval 36 of time. When the random response interval 36 of time is determined, the processor 56 may invoke a timer 62 that counts down until the expiration of the random response interval 36 of time. When the random response interval 36 of time expires, the processor 56 instructs the remote control interface 52 to send the response 30 to the query 28. The response 30 communicates to the remote control 20, and the remote control 20 may then configure itself to remotely control the television 32, as is known.

Figure 3:
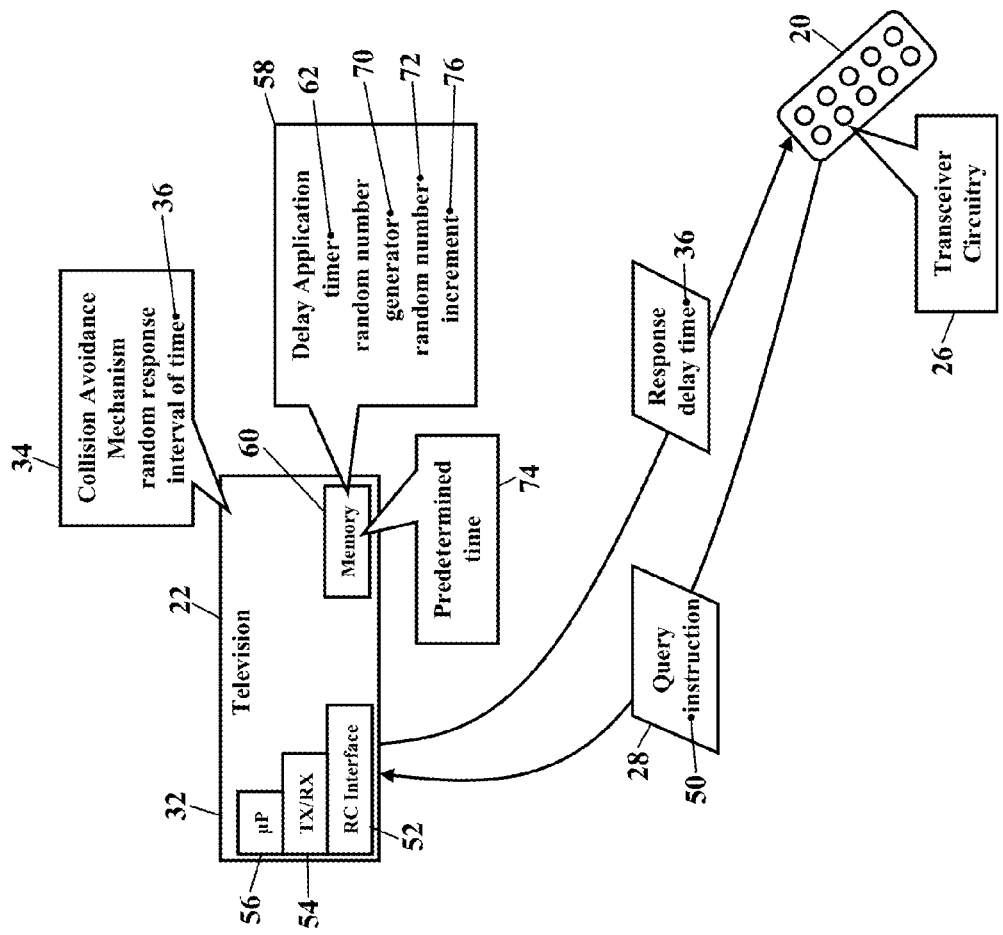
FIG. 3 is a schematic illustrating a random number generator, according to more exemplary embodiments.

FIG. 3 is a schematic illustrating a random number generator 70, according to more exemplary embodiments. Here, when the remote control interface 52 receives the query 28, the delay application 58 may instruct the processor 56 to call or invoke the random number generator 70. The random number generator 70 may be software programming or circuitry that determines a random number 72. The delay application 58 may then instruct the processor 56 to retrieve a predetermined time 74 from the memory 60. The predetermined time 74 represents any baseline or nominal delay. The predetermined time 74 may be any time from nanoseconds to seconds to minutes. The predetermined time 74, for example, may be 100 milliseconds, 200 milliseconds, or even an interval, window, or range of time from 100 milliseconds to 500 milliseconds. The predetermined time 74 may be established by the manufacturer of the electronic device 22 (e.g., the television 32). The predetermined time 74, however, may be a configurable parameter that is chosen or selected during a set-up or initialization procedure. A user of the television 32 and/or the remote control 20, for example, may select the predetermined time 74. The remote control 20 may even assign a unique or different predetermined time 74 to each electronic device 22. However the predetermined time 74 is assigned, the processor 56 may then calculate the random response interval 36 of time according to the formula:

$$\text{random response interval of time } t = (\text{predetermined time}) \times (\text{random number}).$$

Suppose, for example, that the predetermined time 74 is one (1.0) second. When the random number 72 is 0.627, the processor 56 may calculate the random response interval 36 of time as:

$$\text{random response interval of time } t = (1.0 \text{ second}) \times (0.627) = 0.627 \text{ seconds}.$$

The random response interval 36 of time is then implemented. The processor 56 invokes the timer 62 that counts down until the expiration of the random response interval 36 of time. In this example, the timer 62 begins counting down from 0.627 seconds, perhaps according to some increment 76 that is also retrieved from the memory 60. When the random response interval 36 of time expires, the processor 56 instructs the remote control interface 52 to send the response 30 to the query 28. The response 30 then communicates to the remote control 20. When the remote control 20 receives the response 30, the remote control 20 may thus configure itself to remotely control the television 32. As each electronic device 22 (illustrated in FIG. 1) may similarly calculate its respective random response interval 36 of time, the remote control 20 may similarly configure itself to remotely control each electronic device 22.

The random response interval 36 of time may be temporary or permanent. The random response interval 36 of time may be used for every response to queries from the remote control 20. That is, once the random response interval 36 of time is calculated, the electronic device 22 (e.g., the television 32) may use that random response interval 36 of time for all responses to queries. The collision avoidance mechanism 34, however, may calculate a new random response interval 36 of time for each response to an individual query. According to exemplary embodiments, a new random response interval 36 of time may be generated for each response. When the same delay is always used, a collision may occur, and collisions may continue to occur as the two colliding devices keep trying. The collision avoidance mechanism 34 may, instead, assign a life to the random response interval 36 of time, such that a new value is periodically or randomly calculated. The collision avoidance mechanism 34, in other words, may be configured to utilize the random response interval 36 of time on a temporary basis, perhaps according to the user's desires and/or a manufacturer's desires.

Figure 4:
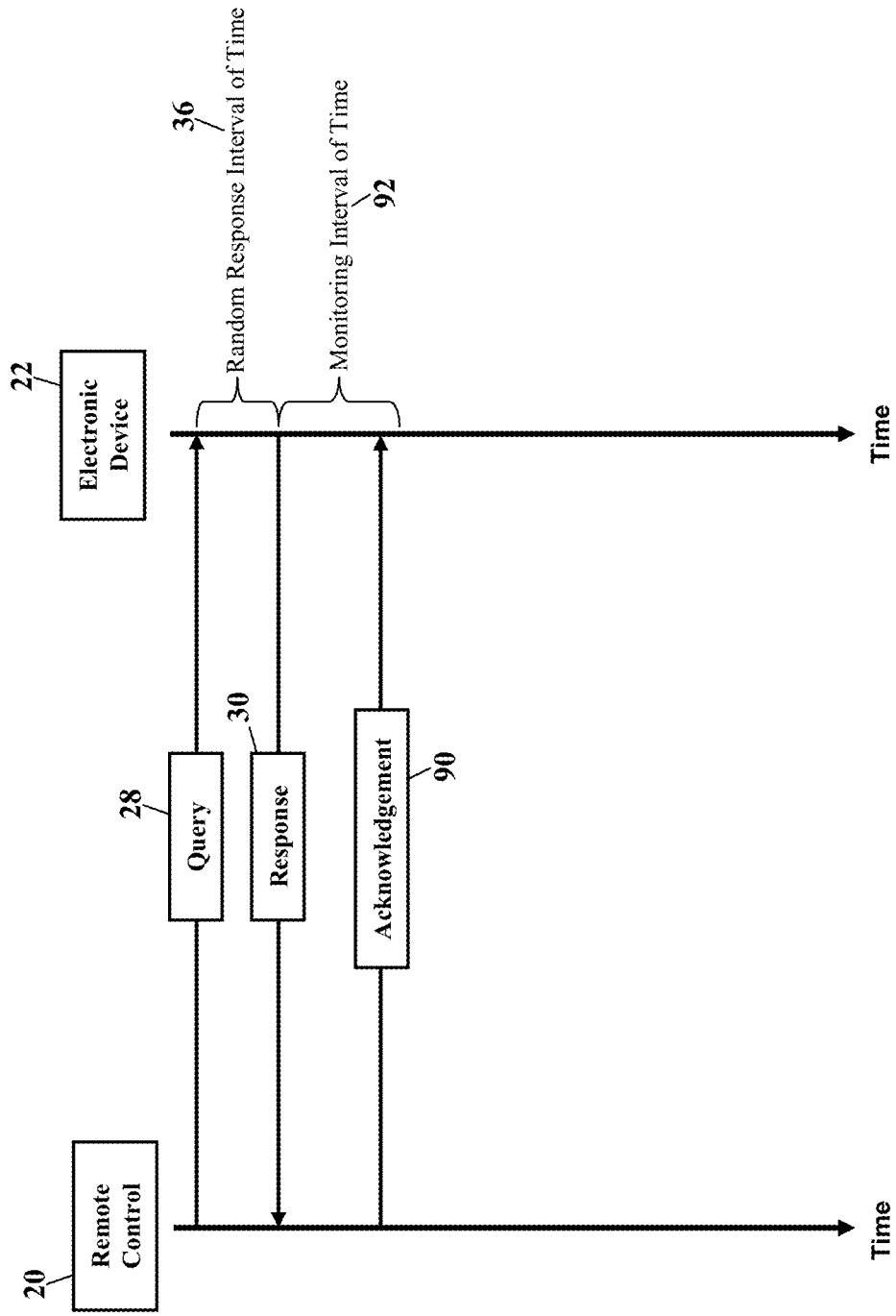
FIGS. 4 and 5 are more schematics illustrating automatic discovery and configuration of electronic devices, according to more exemplary embodiments.
Figure 5:
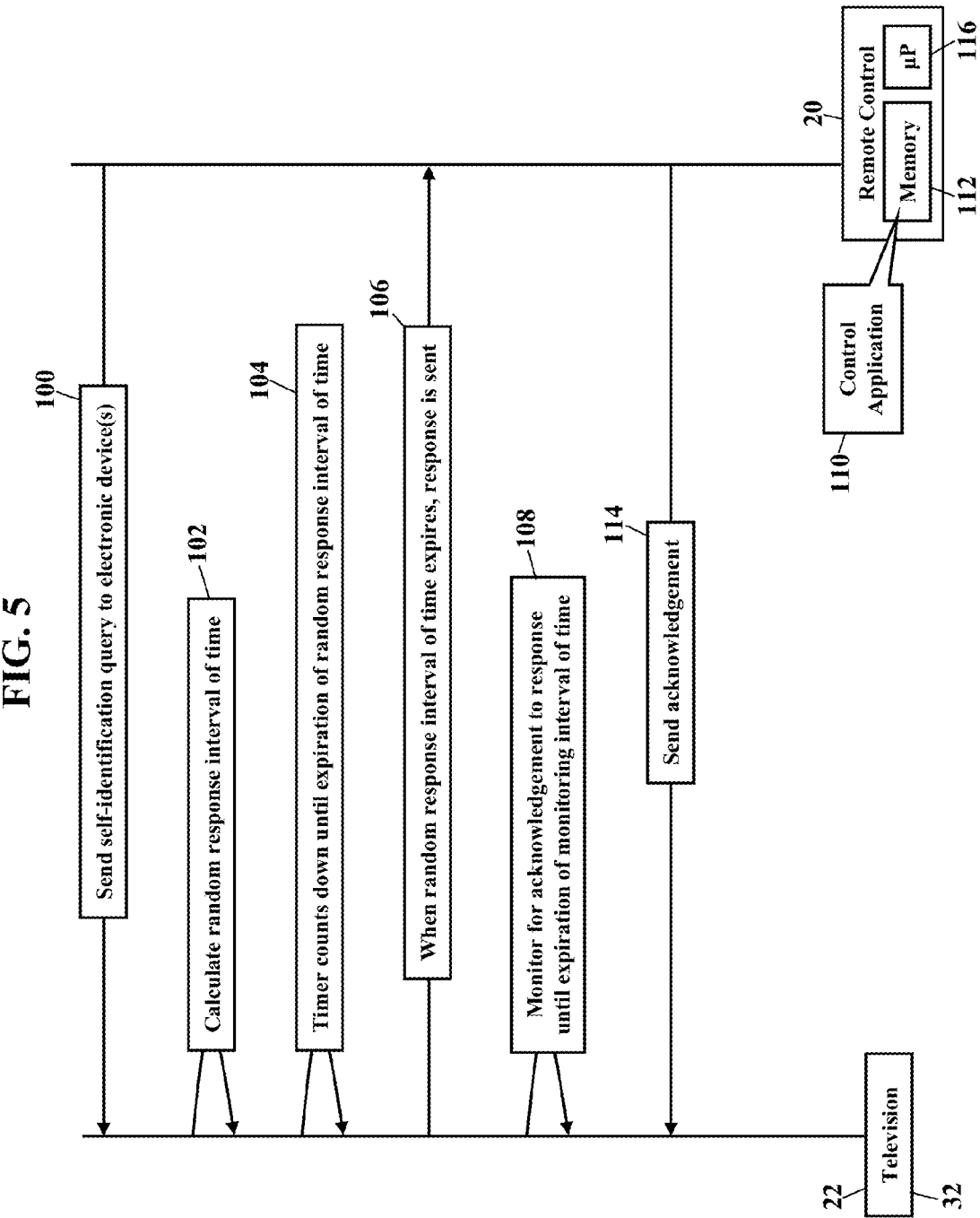

FIGS. 4 and 5 are more schematics illustrating automatic discovery and configuration of electronic devices, according to more exemplary embodiments. FIG. 4 is a timing diagram, while FIG. 5 illustrates a process for self-identification. As FIG. 4 illustrates, the remote control 20 sends the query 28 to the electronic device 22. When the query 28 is received, the electronic device 22 waits for the random response interval 36 of time and then sends the response 30 to the query 28. Once the response 30 is sent, the electronic device 22 monitors for an acknowledgement 90 to the response 30 until expiration of a monitoring interval 92 of time. The monitoring interval 92 of time is any measure or period of time in which the electronic device 22 awaits receipt of the acknowledgement 90, thus indicating that the response 30 was received by the remote control 20. The monitoring interval 92 of time may be any time from nanoseconds to several seconds, such as 500 milliseconds. When the acknowledgement 90 is received, the electronic device 22 has successfully self-identified itself. FIG. 4 also illustrates that the monitoring interval 92 of time may be known to both the remote control 20 and the electronic device 22. Otherwise, the remote control 20 may not know how long to monitor for the response 30.

FIG. 5 illustrates a process for self-identification, according to even more exemplary embodiments. The remote control 20 sends the query 28 to the electronic device 22 (such as the television 32) (Block 100). According to exemplary embodiments, the query 28 is universally understood by all the electronic devices 22 (illustrated in FIG. 1). That is, the query 28 is formatted according to an accepted standard or to an industry specification, such that the query 28 is received and processed by all the electronic devices 22. When the query 28 is received, the random response interval 36 of time is calculated (Block 102). The timer 62 counts down until the expiration of the random response interval 36 of time (Block 104). When the random response interval 36 of time expires, the electronic device 22 (e.g., the remote control interface 52 illustrated in FIGS. 2 and 3) sends the response 30 to the query 28 (Block 106). Once the response is sent, the electronic device 22 monitors for the acknowledgement 90 to the response until expiration of the monitoring interval 92 of time (Block 108).

When the remote control 20 receives the response 30 from the electronic device 22, a control application 110 stored in memory 112 of the remote control 20 may send the acknowledgement 90 (Block 114). The control application 110, for example, may be a set of processor-executable instructions that cause a remote control processor 116 (e.g., "µP"), application specific integrated circuit (ASIC), or other device to send the acknowledgement 90. The control application 110 may instruct the remote control processor 116 to cause the transceiver circuitry (illustrated as reference numeral 26 in FIG. 1) to send the acknowledgment 90 to the television 32 (or any other electronic device 22 illustrated in FIG. 1). The acknowledgement 90 may be broadcasted to all the electronic devices 22, or the acknowledgement 90 may be addressed and destined for a single electronic device 22 (e.g., the television 32). Because, for example, the television 32 self-identified itself (using the response 30 to the query 28), the acknowledgement 90 may include codes or other information that uniquely format the acknowledgement 90 to the television 32 (or to any electronic device 22 for which the acknowledgement 90 is received). The acknowledgement 90, in other words, may only be formatted, understood, or decipherable by the television 32.

Figure 6:
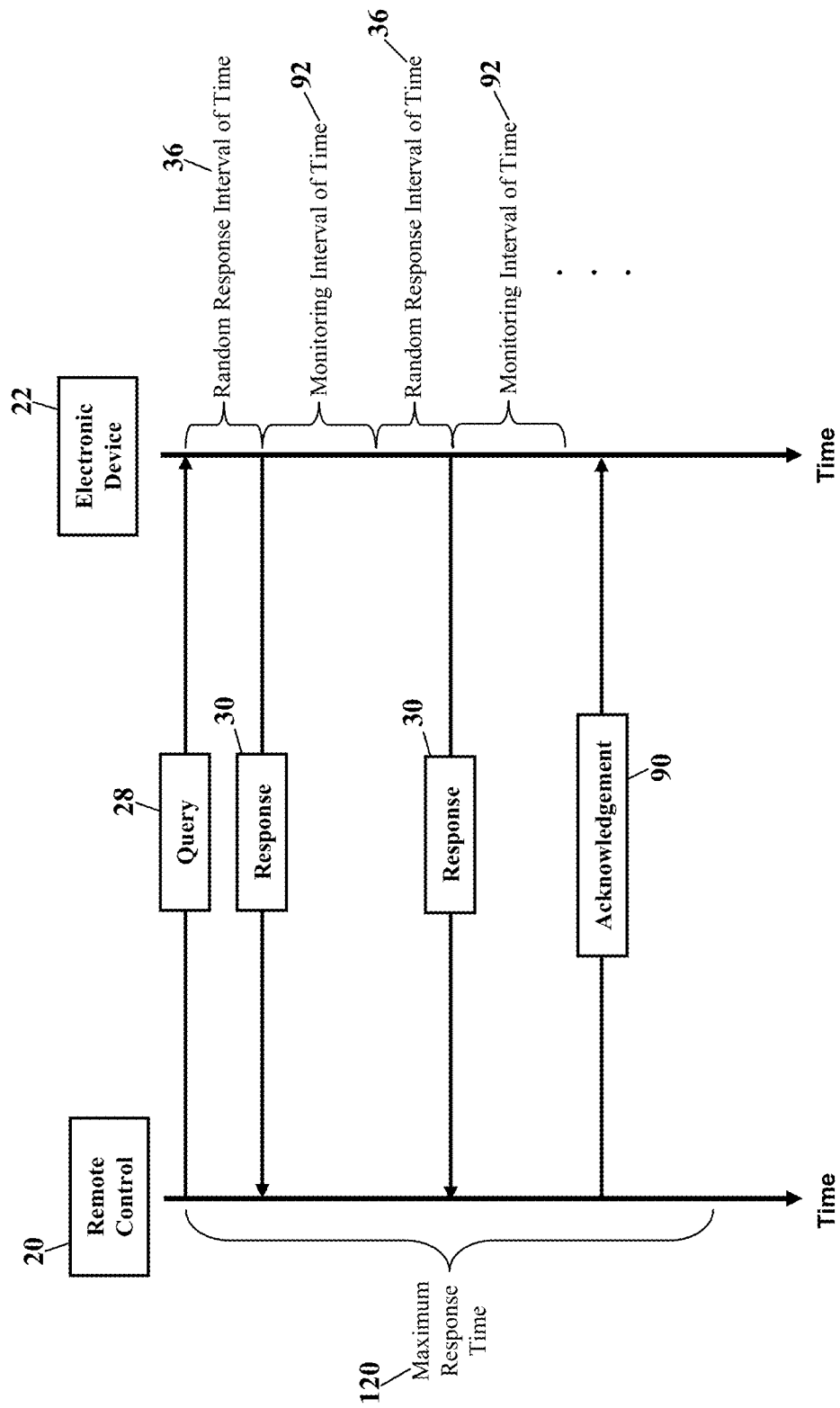
FIGS. 6 and 7 are more schematics illustrating automatic configuration of electronic devices, according to more exemplary embodiments.
Figure 7:
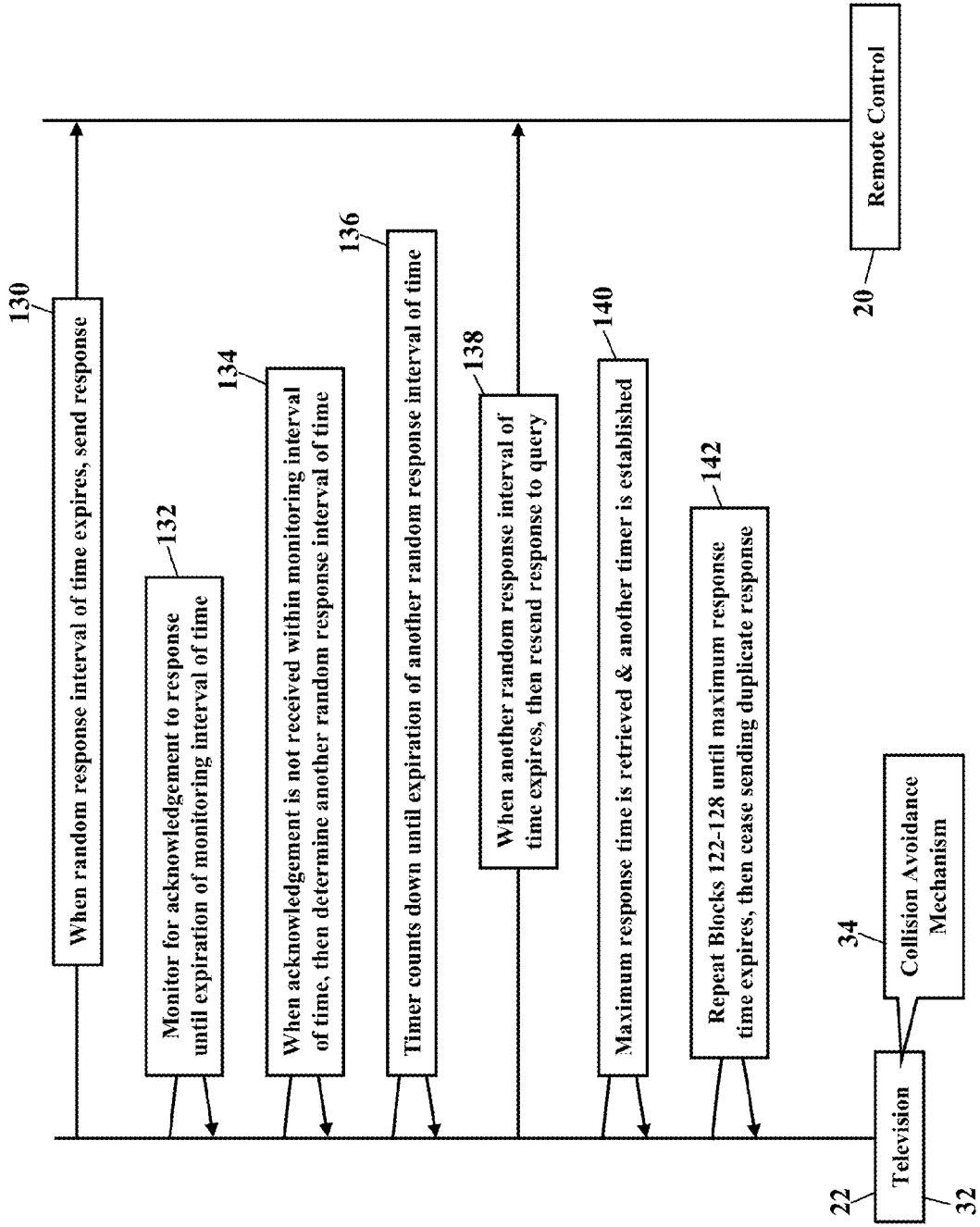

FIGS. 6 and 7 are more schematics illustrating automatic configuration of electronic devices, according to more exemplary embodiments. Here the electronic device 22 (such as the television 32) waits for the acknowledgement 90 from the remote control 20. When no acknowledgement 90 is received, the electronic device 22 may resend duplicate responses until the acknowledgement 90 is received or until a maximum response time expires. FIG. 6 is a timing diagram that illustrates this embodiment. The remote control 20 sends the query 28 to the electronic device 22. When the query 28 is received, the electronic device 22 waits for the random response interval 36 of time and then sends the response 30 to the query 28. Once the response 30 is sent, the electronic device 22 monitors for the acknowledgement 90 to the response 30 until expiration of the monitoring interval 92 of time. When the acknowledgement 90 is not received within the monitoring interval 92 of time, then another random response interval 36 of time is determined. When the another random response interval 36 of time has expired, then the response 30 to the query is resent. The electronic device 22 again monitors for the acknowledgement 90 to the response 30 until expiration of the monitoring interval 92 of time. The collision avoidance mechanism (illustrated as reference numeral 34 in FIGS. 1-3) continues resending the response 30, according to each random response interval 36 of time, until either the acknowledgement 90 is received or until a maximum response time 120 expires. The maximum response time 120 is any measure or period of time at which the collision avoidance mechanism 34 "times out" and the electronic device 22 ceases sending duplicate responses 30 to the query 28. The maximum response time 120 may be any value, such as two or three seconds. When the maximum response time 120 expires without having received the acknowledgement 90, the electronic device 22 thus stops expecting the acknowledgment 90 from the remote control 20. Because no acknowledgement was received, the collision avoidance mechanism 34 may thus assume that self-identification failed.

FIG. 7 illustrates a more detailed process for self-identification, according to even more exemplary embodiments. When the random response interval 36 of time expires, the remote control 20 sends the response 30 to the query 28 (Block 130). Once the response 30 is sent, the remote control 20 monitors for the acknowledgement to the response 30 until expiration of the monitoring interval 92 of time (Block 132). When the acknowledgement 90 is not received within the monitoring interval 92 of time, then another random response interval 36 of time is determined (Block 134). The timer 62 counts down until the expiration of the another random response interval 36 of time (Block 136). When the another random response interval 36 of time has expired, then the response 30 to the query 28 is resent (Block 138). The maximum response time 120 is retrieved and another, second timer is established (Block 140). The second timer counts down (according to some increment) and the process repeats Block 132 through Block 138 until the maximum response time 120 expires, when the electronic device 22 ceases sending duplicate responses to the query (Block 142). When the maximum response time 120 expires without having received the acknowledgement 90, the electronic device 22 thus stops expecting an acknowledgment from the remote control 20. Because no acknowledgement was received, the collision avoidance mechanism 34 may thus assume that self-identification failed.

Figure 8:
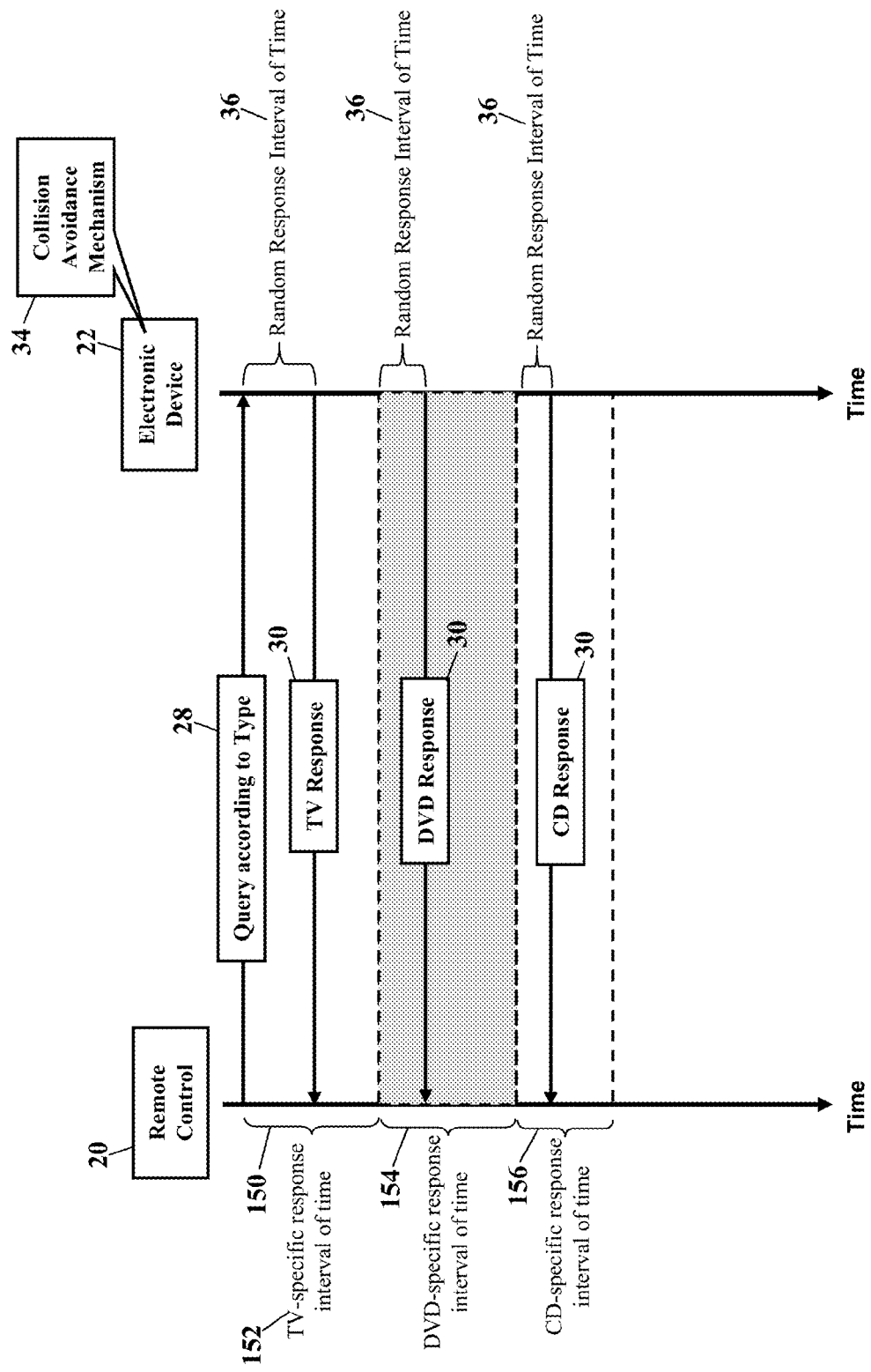
FIG. 8 is a timing diagram for another process for controlling electronic devices, according to even more exemplary embodiments.

FIG. 8 is a timing diagram for another process for controlling electronic devices, according to even more exemplary embodiments. FIG. 8 illustrates a slightly more complex identification process for more complex multimedia environments. Some users may have elaborate multimedia entertainment systems, perhaps including multiple televisions, multiple DVD players, and other multiple devices of the same general type. FIG. 8, then, illustrates device-specific response intervals 150 of time. Only electronic devices of a particular type may send responses to queries during a device-specific response interval 150 of time. That is, each type of electronic device 22 is assigned a particular response interval of time. A first device-specific response interval 152 of time, for example, would be reserved for televisions. Only televisions may send responses to queries during the television-specific response interval of time. DVD players must await their respective DVD-specific response interval 154 of time before sending a response. Similarly, satellite radio devices, record/album players, and any other type of electronic devices must await their respective device-specific response intervals of time. These device-specific response intervals 150 of time help minimize the likelihood of response collisions between similar types of electronic devices.

As FIG. 8 illustrates, the remote control 20 sends the query 28 to the electronic devices 22. The query 28 instructs each electronic device 22 to respond according to a type of device. When the query 28 is received, each electronic device's resident collision avoidance mechanism 34 obtains or retrieves its corresponding device-specific response interval 150 of time. The device-specific response interval 150 of time may be received with the query 28 or retrieved from memory. The device-specific response interval 150 of time may be a window of time that is reserved for responses by that type of device. The device-specific response interval 150 of time, for example, may be 100-250 milliseconds for televisions, 275-425 milliseconds for satellite radio devices, and 450-600 milliseconds for tuner type devices. The device-specific response interval 150 of time may be specified by a manufacturer of the electronic device 22. An industry consortium or governing body may establish the device-specific response interval 150 of time. Because there may only be a small number of categories or "types" of devices, the manufacturers and/or a governing body (e.g., I.E.E.E) may establish/manage the device-specific response interval 150 of time. The user of the remote control 20 may even establish the device-specific response interval 150 of time during a set-up procedure. As another alternative, exemplary embodiments may utilize a sequence of queries, wherein different types of devices are queried in sequence. The remote control 28, for example, may be programmed to first query televisions, then to query DVD devices, then to query CD devices, and so on. Regardless, each type of electronic device 22 retrieves its associated device-specific response interval 150 of time. FIG. 8, for example, illustrates that only televisions may send responses 30 to the query 28 during the television-specific response interval 152 of time. DVD-type electronic devices (e.g., DVD players) must await their respective DVD-specific response interval 154 of time before sending the response 30 to the query 28. Similarly, CD-type electronic devices (e.g., CD players) must await their respective CD-specific response interval 156 of time before sending the response 30 to the query 28.

FIG. 8 also illustrates the random response interval 36 of time. When an electrical device's response interval 150 of time opens, or becomes available, the electronic device 22 may additionally wait for the random response interval 36 of time before sending the response 30. The collision avoidance mechanism 34, however, may compare the random response interval 36 of time to the device-specific response interval 150 of time. Should the random response interval 36 of time be greater than (e.g., longer in time) than the corresponding device-specific response interval 150 of time, then the random response interval 36 of time must be recalculated. The resident collision avoidance mechanism 34 may prohibit the random response interval 36 of time to lie outside or beyond the corresponding device-specific response interval 150 of time. Otherwise an electronic device 22 would be sending its response 30 outside its corresponding device-specific response interval 150 of time, thus defeating the collision avoidance mechanism 34.

Figure 9:
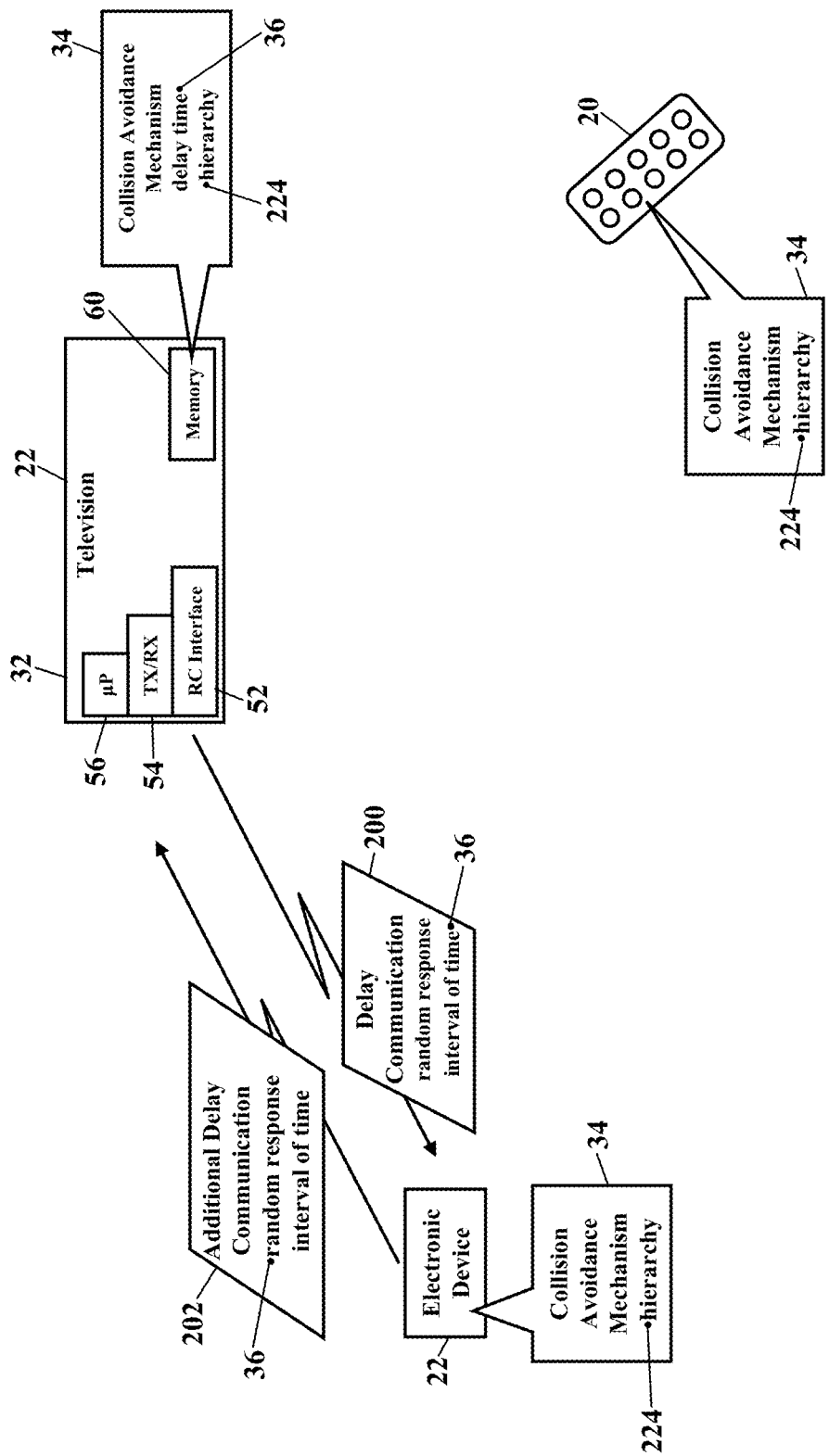
FIG. 9 is a schematic illustrating coordination of random delays amongst the electronic devices 22, according to even more exemplary embodiments.

FIG. 9 is a schematic illustrating coordination of random delays amongst the electronic devices 22, according to even more exemplary embodiments. Here the electronic devices 22 may share their random response intervals 36 of time amongst each other. That is, each electronic device 22 may send its individual random response interval 36 of time to every other electronic device 22. Because each electronic device 22 includes the collision avoidance mechanism 34, the electronic devices 22 may coordinate their delay policies to ensure that responses 30 do not collide at the remote control 20. The remote control 20, as earlier explained, queries the electronic devices 22. Before sending the response 30, though, each electronic device 22 calls or invokes its resident collision avoidance mechanism 34. As the above paragraphs explained, each electronic device's collision avoidance mechanism 34 calculates its respective random response interval 36 of time.

The electronic devices 22 may then share their respective delay times. Each electronic device 22 may send its respective random response interval 36 of time to the other electronic devices 22. FIG. 9, for simplicity, only illustrates the television 32 sharing its random response interval 36 of time. The reader should understand, though, that any, some, or all of the electronic devise 22 may communicate their respective delay times. As FIG. 9 illustrates, the television's transceiver 54 broadcasts a delay communication 200 to the other electronic devices 22. The delay communication 200 includes information describing the television's respective random response interval 36 of time. The television's transceiver 54 may also receive additional delay communications 202 from the other electronic devise(s) 22. Each electronic device 22, in other words, may be informed of every other electronic device's random response interval 36 of time. Now that the electronic devices 22 know each other's delay times, the electronic devices 22 may avoid implementing similar delay times when responding to queries from the remote control 20.

A hierarchy 224, for example, may be used when conflicts occur. When two or more electronic devices 22 have similar random response intervals 36 of time (such that responses 30 may collide at the remote control 20), at least one of those electronic devices 22 may need to calculate a new random response interval 36 of time. The hierarchy 224, then, may be used to determine which electronic device 22 must calculate the new random response interval 36 of time. When two or more electronic devices 22 have similar delay times, the electronic device 22 with the lower hierarchical value may be required to calculate the new random response interval 36 of time. The electronic device 22 with the greater hierarchical value may be permitted to continue using its associated random response interval 36 of time.

The hierarchy 224 may be determined by any means. The hierarchy 224, for example, may be alphabetically established by manufacturer and/or by component. When the hierarchy 224 is alphabetically arranged by manufacturer, a BOSE® receiver may have a higher priority or hierarchical value than a ZENITH® component (BOSE® is a registered trademark of Bose Corporation, while ZENITH® is a registered trademark of Zenith Electronics Corporation). When the BOSE® receiver and the ZENITH® component have the same, or too similar, delay times 36, the lower hierarchical ZENITH® component may be required to calculate a new random response interval 36 of time. Similarly, a "CD player" may have a greater hierarchical value than a "DVD player" or a "television." The hierarchy 224 may even have nested values, such that a ZENITH® "CD player" has a greater hierarchical than a ZENITH® "television." The hierarchy 224 may also be established using model numbers, serial numbers, or any other alphanumeric information which may be hierarchically arranged.

The hierarchy 224, however, may be advantageously established by usage. The electronic device 22 with the most usage may have a greater hierarchical value than a lesser-used electronic device 22. Suppose, for example, that each electronic device's collision avoidance mechanism 34 tracks or tallies hours of operation. The television's collision avoidance mechanism 34, for example, may sum the minutes/hours in which the television is powered "ON." The hierarchy 224, then, may be established according to these hours of usage. When the BOSE® receiver and the ZENITH® component have the same, or too similar, random response intervals 36 of time, the electronic device 22 with the lesser amount of usage may be required to calculate a new random response interval 36 of time. The term "usage" may also include the number of interactions with the remote control 20. Each electronic device's collision avoidance mechanism 34 may additionally or alternatively track, tally, or sum the number of queries, instructions, and/or responses received by, and/or sent to, the remote control 20. Each electronic device's collision avoidance mechanism 34, in other words, monitors the number of interactions with the remote control 20. The electronic device 22 having the greater number of interactions may have a greater hierarchical value. Any electronic device 22 having a lesser number of interactions may be required to calculate the new random response interval 36 of time. As FIG. 9 illustrates, the remote control 20 may also store and execute its own resident collision avoidance mechanism 226, and this collision avoidance mechanism 226 may monitor the number of interactions with any of the electronic devices 22.

The hierarchy 224 may also be user-configured. The user may assign a hierarchical value to each electronic device 22, perhaps during a set-up or configuration procedure. While user-configuration of the hierarchy 224 is possible, though, a fully automatic arbitration process is preferred for a simpler set-up.

The electronic devices 22 may share their respective delay times by any means. In FIG. 9 the television's transceiver 54 wirelessly broadcasts the delay communication 200 to the other electronic devices 22. The delay communication 200, however, may be unicast or addressed to each individual electronic device 22. The delay communication 200 may even be sent over a wired connection to another electronic device 22.

Figure 10:
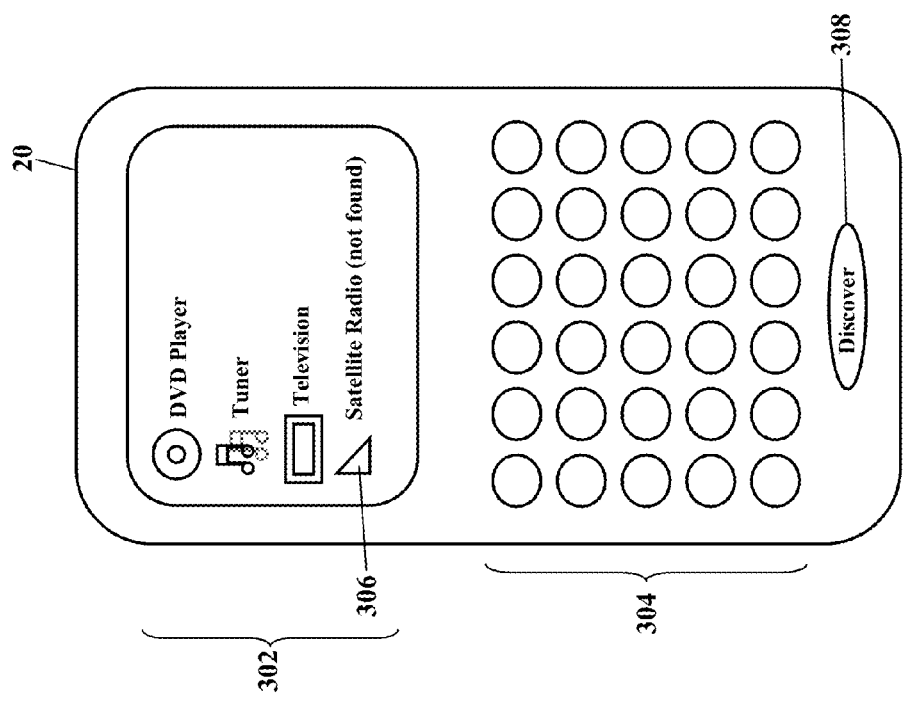
FIG. 10 is a schematic further illustrating a remote control, according to more exemplary embodiments.

FIG. 10 is a schematic further illustrating the remote control 20, according to more exemplary embodiments. Here the remote control 20 may have a display 300 that indicates what electronic devices (illustrated as reference numeral 22 in FIG. 1) have been discovered. The remote control processor (illustrated as reference numeral 116 in FIG. 5) may cause the display 300 to visually present a unique icon 302 for each discovered device 22. The user of the remote control 20 may then use a keypad 304 or other means to scroll amongst the icons 302, select a desired icon 302, and then input commands to that selected electronic device 22. When a desired electronic device 22 is not represented with a corresponding icon 302, the remote control 20 may have been unable to "discover" that desired electronic device. Suppose, for example, the user wishes to control a satellite radio, but the display 300 lacks or does not present a corresponding satellite radio icon. Or, as FIG. 10 illustrates, the display 300 may visually present a unique satellite radio icon 306, yet the display 300 indicates that a satellite radio was not discovered. The user may then instruct the remote control 20 to initiate a discovery process, in which the remote control 20 queries the electronic devices 22 (as above explained). The user, for example, may depress or otherwise select a "Discovery" button 308 to initiate the query 28 to the electronic devices 22. Or the user may highlight or otherwise select the satellite radio icon 306 and initiate the discovery process. The remote control 20 may automatically permanently store all discovered devices until the "Discovery" button 308 is again depressed. To avoid inadvertent "rediscovery," especially in a new environment (e.g., a different room), a "lock" switch may be included. In addition, the remote control 20 may optionally enable the user to store the results of device discoveries on a room-by-room basis, such as discovered devices in "the kitchen" and discovered devices in the "family room." The remote control 20 may thus be used in various rooms in a house without the need for exercising the discovery capability each time the user changes rooms.

Figure 11:
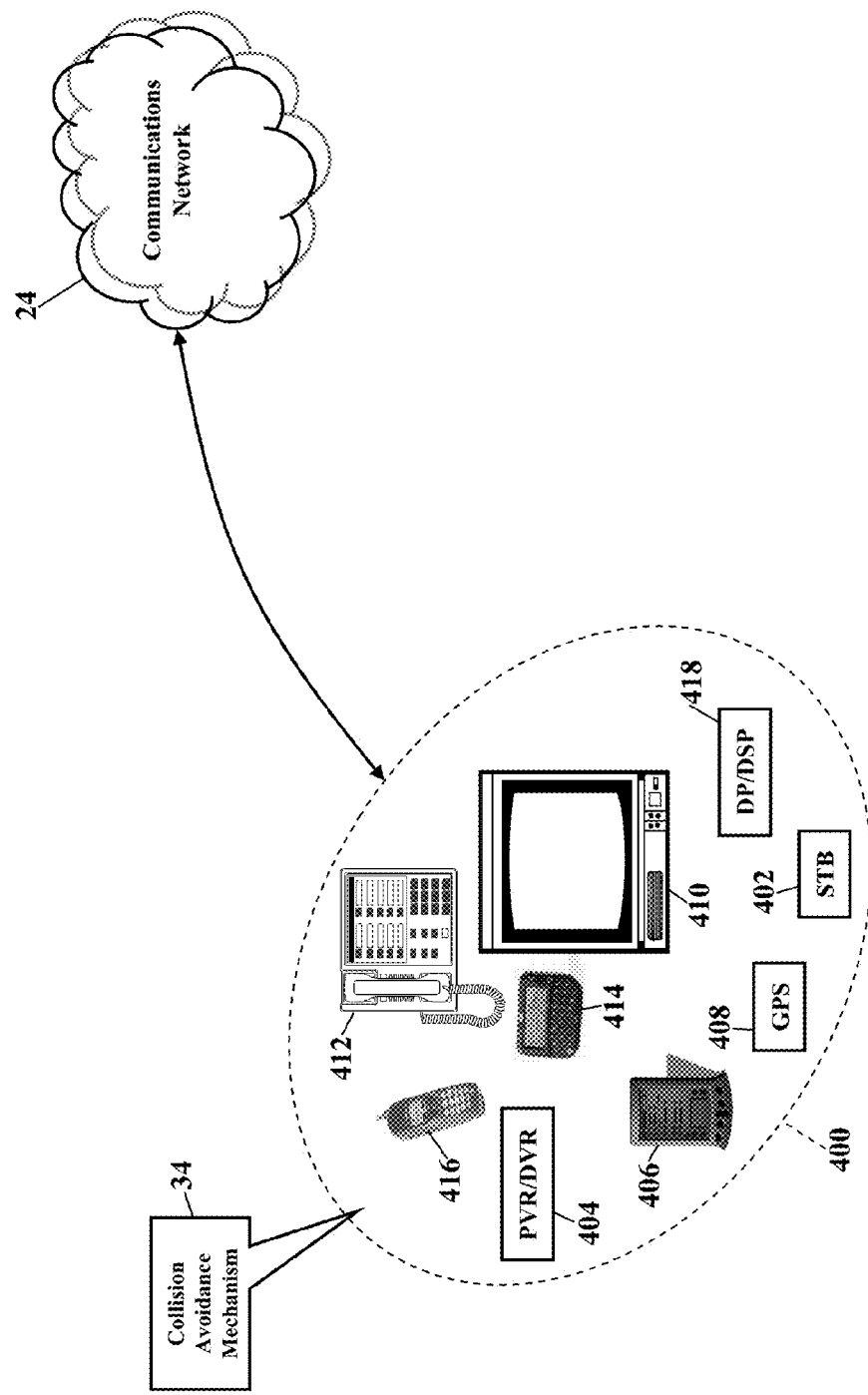
FIG. 11 depicts other possible operating environments for additional aspects of the exemplary embodiments.

FIG. 11 depicts other possible operating environments for additional aspects of the exemplary embodiments. FIG. 11 illustrates that the collision avoidance mechanism 34 may alternatively or additionally operate within various other devices 400. FIG. 11, for example, illustrates that the collision avoidance mechanism 34 may entirely or partially operate within a set-top box (402), a personal/digital video recorder (PVR/DVR) 404, personal digital assistant (PDA) 406, a Global Positioning System (GPS) device 408, an interactive television 410, an Internet Protocol (IP) phone 412, a pager 414, a cellular/satellite phone 416, or any computer system and/or communications device utilizing a digital processor and/or a digital signal processor (DP/DSP) 418. The device 400 may also include watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described. If, however, the reader desires more details, the reader is invited to consult the following sources: ANDREW TANENBAUM, COMPUTER NETWORKS ($4^{th}$ edition 2003); WILLIAM STALLINGS, COMPUTER ORGANIZATION AND ARCHITECTURE: DESIGNING FOR PERFORMANCE ($7^{th}$ Ed., 2005); and DAVID A. PATTERSON & JOHN L. HENNESSY, COMPUTER ORGANIZATION AND DESIGN: THE HARDWARE/SOFTWARE INTERFACE ($3^{rd}$. Edition 2004); LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module—ME)* interface (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, ITV HANDBOOK: TECHNOLOGIES AND STANDARDS (2004).

Figure 12:
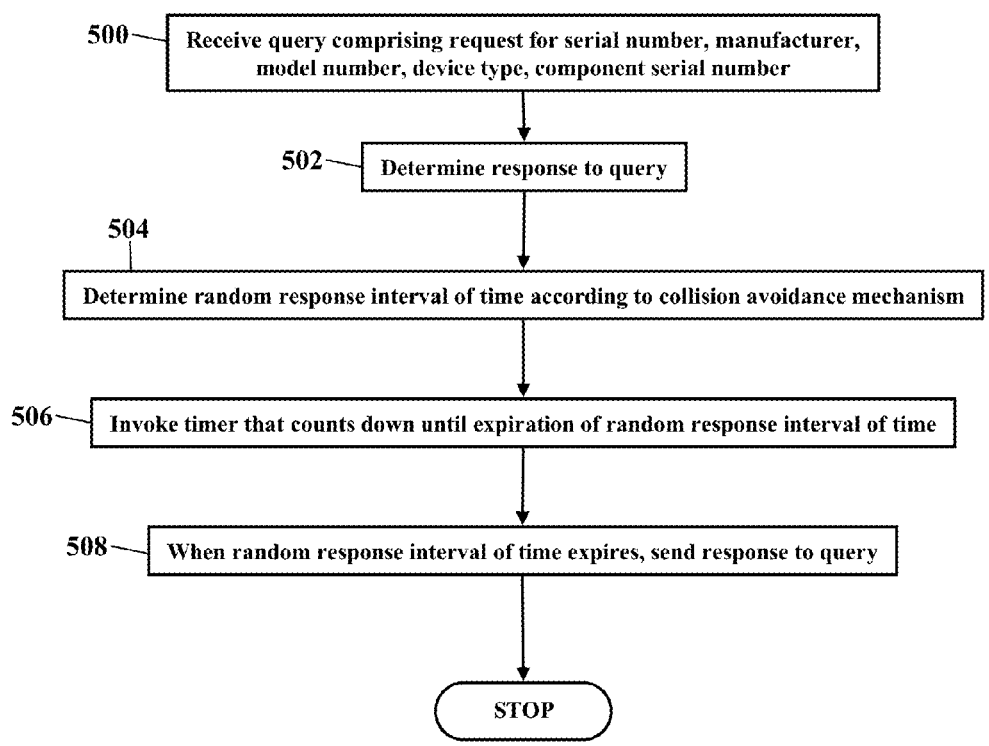
FIGS. 12-15 are flowcharts illustrating methods of discovering an electronic device, according to even more exemplary embodiments.

FIG. 12 is a flowchart illustrating a method of discovering an electronic device, according to even more exemplary embodiments. A query is received at a remote control interface (Block 500). The query may include information or protocols that request an electronic device's serial number, manufacturer, model number, device type, and/or component serial number (such as a processor serial number or wafer number). A response to the query is determined (Block 502). A random response interval of time is determined according to a collision avoidance mechanism (Block 504). A timer is invoked that counts down until the expiration of the random response interval of time (Block 506). When the random response interval of time has expired, then the response to the query is sent (Block 508).

Figure 13:
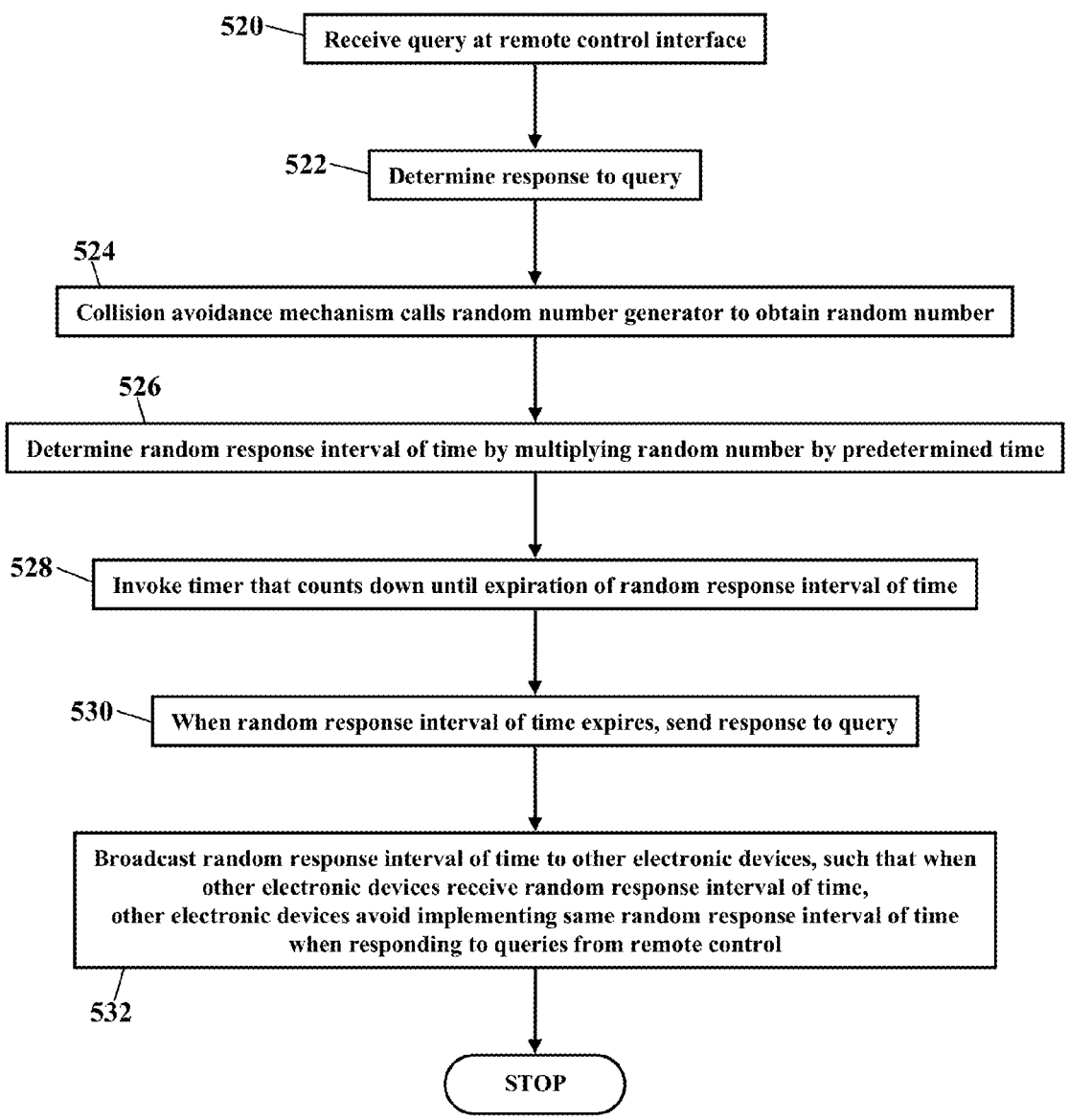

FIG. 13 is another flowchart illustrating a method of discovering an electronic device, according to even more exemplary embodiments. A query is received at a remote control interface (Block 520) and a response is determined (Block 522). A collision avoidance mechanism calls a random number generator to obtain a random number (Block 524). A random response interval of time is determined by multiplying the random number by a predetermined time (Block 526). A timer is invoked that counts down until the expiration of the random response interval of time (Block 528). When the random response interval of time has expired, then the response to the query is sent (Block 530). The random response interval of time may be broadcasted to other electronic devices, such that when the other electronic devices receive the random response interval of time, the other electronic devices avoid implementing the same random response interval of time when responding to queries from a remote control (Block 532).

Figure 14:
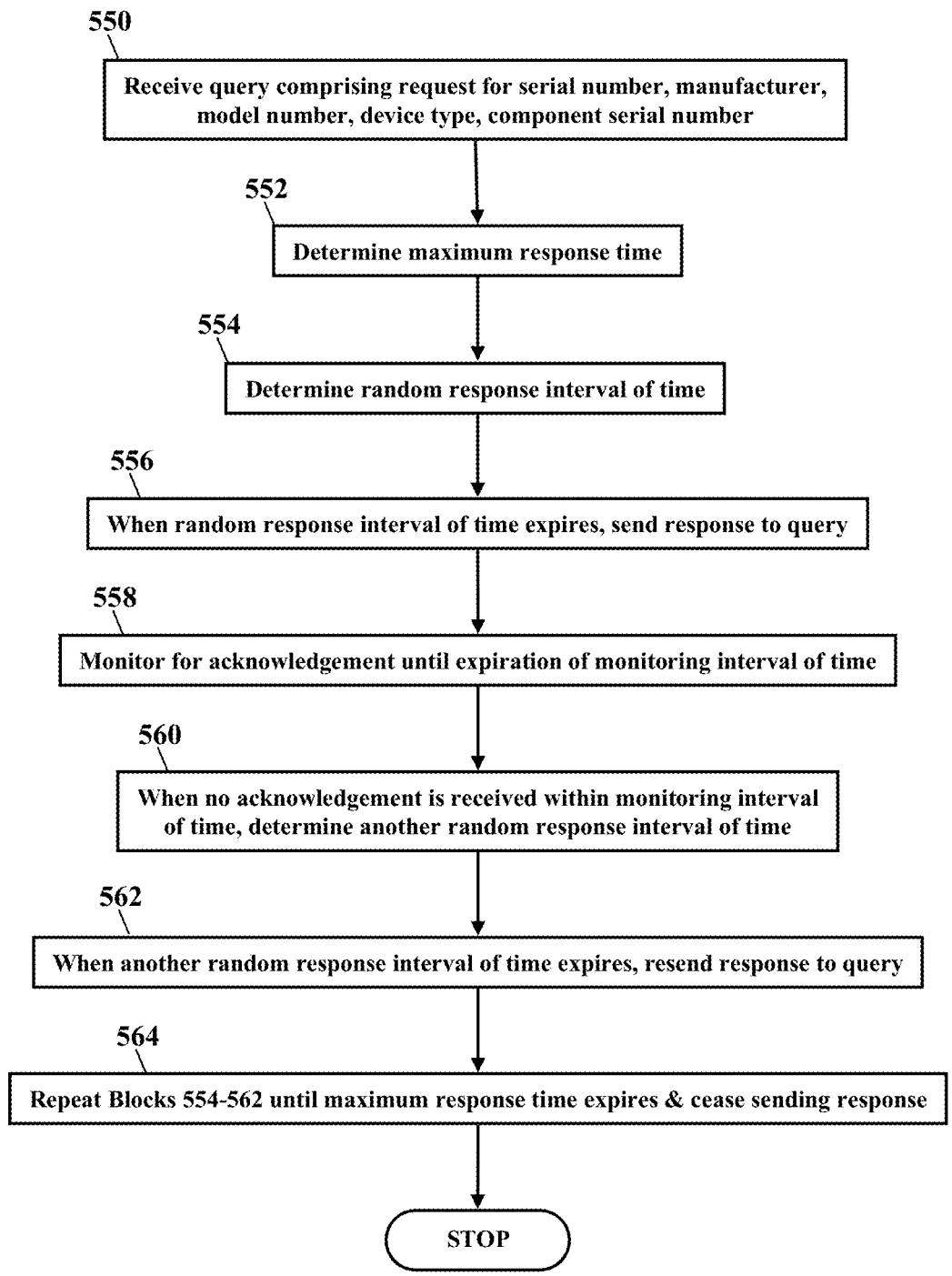

FIG. 14 is another flowchart illustrating a method of discovering an electronic device, according to even more exemplary embodiments. A query is received comprising a request for a manufacturer's serial number associated with the electronic device, the serial number distinguishing the electronic device from other devices (Block 550). The query may additionally or alternatively request the electronic device's manufacturer, model number, device type, and/or component serial number (such as a processor serial number or wafer number). A maximum response time 120 is determined (Block 552). A random response interval of time is also determined (Block 554). When the random response interval of time expires, a response to the query is sent (Block 556). The electronic device 22 monitors for an acknowledgement 90 to the response 30 until expiration of the monitoring interval 92 of time (Block 558). When no acknowledgement is received within the monitoring interval 92 of time, then another random response interval 36 of time is determined (Block 560). When the another random response interval 36 of time has expired, then the response 30 to the query 28 is again sent (Block 562). Blocks 554 through 562 repeat until the maximum response time 120 expires, at which the electronic device 22 ceases sending the response 30 to the query 28 (Block 564).

Figure 15:
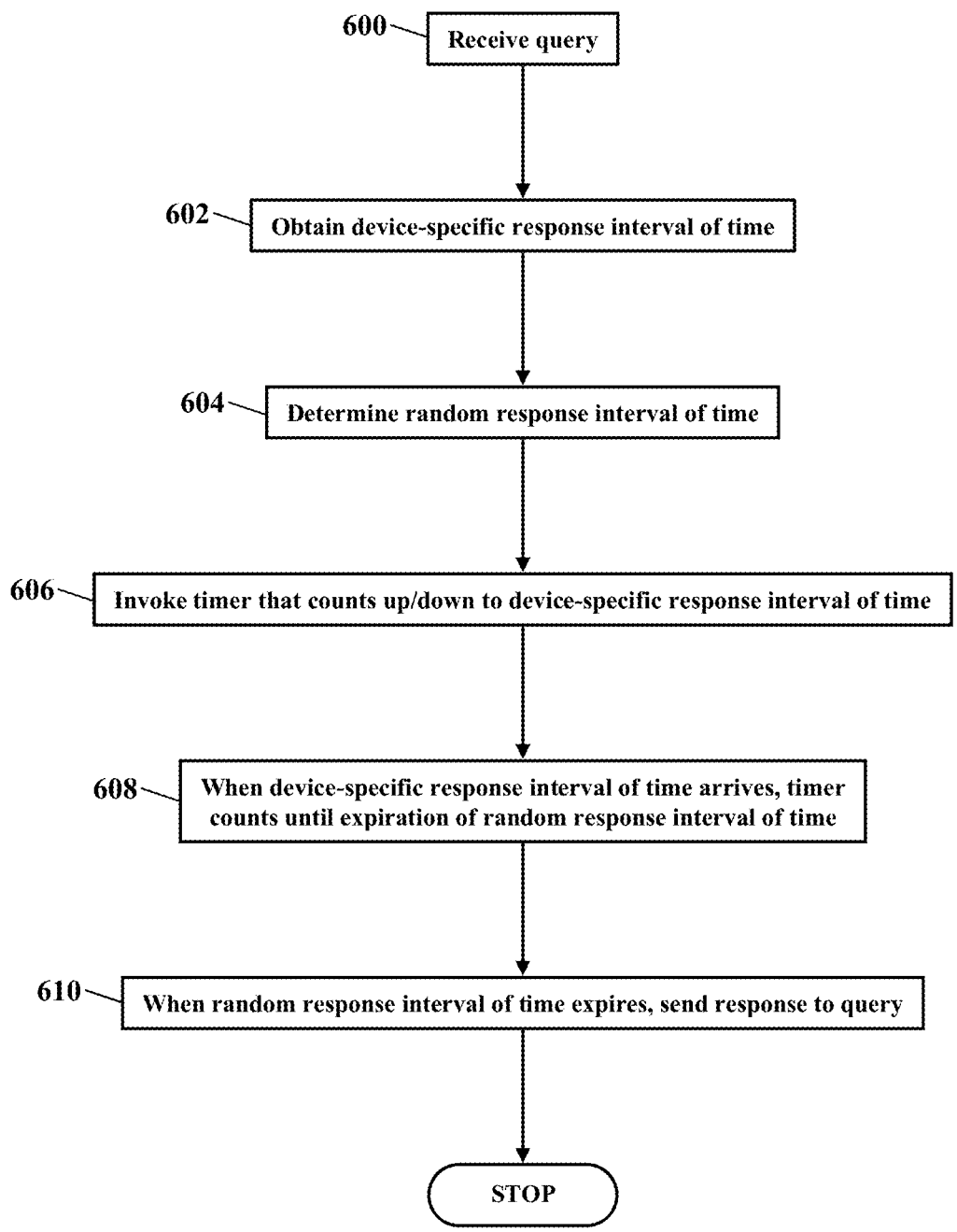

FIG. 15 is another flowchart illustrating a method of discovering an electronic device, according to even more exemplary embodiments. A query is received (Block 600). At least one device-specific response interval of time is obtained that describes a window of time in which the electronic device is permitted to send the response to the query (Block 602). A random response interval of time is determined (Block 604). A first timer is invoked that counts up or down to the device-specific response interval of time (Block 606). When the device-specific response interval of time arrives, a second timer may begin counting until expiration of the random response interval of time (Block 608). When the random response interval of time expires, a response to the query is sent (Block 610).

Exemplary embodiments may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-subscribers, licensees, and assignees. These types of computer-readable media, and other types not mention here but considered within the scope of the exemplary embodiments. A computer program product comprises processor-executable instructions for discovering electronic devices.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
    receiving, by an electronic device, a query specifying a network address associated with a remote control;
    retrieving, by the electronic device, a category associated with the electronic device;
    querying, by the electronic device, an electronic database for the category associated with the electronic device, the electronic database electronically associating response intervals of time and categories of electronic devices including the category associated with the electronic device;
    identifying, by the electronic device, a response interval of time of the response intervals of time in the electronic database that is electronically associated with the category associated with the electronic device;
    determining, by the electronic device, a response to the query; and
    sending, by the electronic device, the response within the response interval of time that is electronically associated with the category.

2. The method of claim 1, further comprising determining the response based on the category.

3. The method of claim 1, further comprising determining a random response interval of time.

4. The method of claim 3, further comprising comparing the response interval of time to the random response interval of time.

5. The method of claim 4, further comprising determining the random response interval of time exceeds the response interval of time.

6. The method of claim 4, further comprising recalculating the random response interval of time in response to the random response interval of time exceeding the response interval of time.

7. The method of claim 4, further comprising prohibiting the random response interval of time from exceeding the response interval of time.

8. An electronic device, comprising:
    a processor; and
    a memory device, the memory device storing code, the code when executed causing the processor to perform operations, the operations comprising:
    receiving a query specifying a network address associated with a remote control;
    retrieving a category associated with the electronic device;
    querying an electronic database for the category associated with the electronic device, the electronic database electronically associating response intervals of time and categories of electronic devices including the category associated with the electronic device;
    identifying a response interval of time of the response intervals of time in the electronic database that is electronically associated with the category associated with the electronic device;
    determining a response to the query; and
    sending the response within the response interval of time that is electronically associated with the category.

9. The electronic device of claim 8, wherein the operations further comprise determining the response based on the category.

10. The electronic device of claim 8, wherein the operations further comprise determining a random response interval of time.

11. The electronic device of claim 10, wherein the operations further comprise comparing the response interval of time to the random response interval of time.

12. The electronic device of claim 11, wherein the operations further comprise determining the random response interval of time exceeds the response interval of time.

13. The electronic device of claim 11, wherein the operations further comprise recalculating the random response interval of time in response to the random response interval of time exceeding the response interval of time.

14. The electronic device of claim 11, wherein the operations further comprise prohibiting the random response interval of time from exceeding the response interval of time.

15. A memory device storing instructions that when executed cause a processor to perform operations, the operations comprising:
   receiving a query specifying a network address associated with a remote control;
   retrieving a category associated with the electronic device;
   querying an electronic database for the category associated with the electronic device, the electronic database electronically associating response intervals of time and categories of electronic devices including the category associated with the electronic device;
   identifying a response interval of time of the response intervals of time in the electronic database that is electronically associated with the category associated with the electronic device;
   determining a response to the query; and
   sending the response within the response interval of time that is electronically associated with the category.

16. The memory device of claim 15, wherein the operations further comprise determining the response based on the category.

17. The memory device of claim 15, wherein the operations further comprise determining a random response interval of time.

18. The memory device of claim 17, wherein the operations further comprise comparing the response interval of time to the random response interval of time.

19. The memory device of claim 18, wherein the operations further comprise determining the random response interval of time exceeds the response interval of time.

20. The memory device of claim 19, wherein the operations further comprise recalculating the random response interval of time in response to the random response interval of time exceeding the response interval of time.

* * * * *